US008271200B2

(12) United States Patent
Sieracki

(10) Patent No.: US 8,271,200 B2
(45) Date of Patent: Sep. 18, 2012

(54) SYSTEM AND METHOD FOR ACOUSTIC SIGNATURE EXTRACTION, DETECTION, DISCRIMINATION, AND LOCALIZATION

(76) Inventor: Jeffrey M. Sieracki, Silver Spring, MD (US)

( * ) Notice: Subject to any disclaimer, the term of this patent is extended or adjusted under 35 U.S.C. 154(b) by 1194 days.

(21) Appl. No.: 11/387,034

(22) Filed: Mar. 22, 2006

(65) Prior Publication Data

US 2006/0241916 A1  Oct. 26, 2006

Related U.S. Application Data

(63) Continuation of application No. 10/748,182, filed on Dec. 31, 2003, now Pat. No. 7,079,986.

(60) Provisional application No. 60/664,518, filed on Mar. 23, 2005.

(51) Int. Cl.
*G01N 33/48* (2006.01)
*G10L 19/00* (2006.01)

(52) U.S. Cl. .................................. 702/19; 704/E19.001

(58) Field of Classification Search .......................... None
See application file for complete search history.

(56) References Cited

U.S. PATENT DOCUMENTS

| | | | |
|---|---|---|---|
| 5,502,764 A | 3/1996 | Maccache | |
| 5,699,121 A | 12/1997 | Zakhor et al. | |
| 5,764,921 A | 6/1998 | Banham et al. | |
| 6,016,546 A | 1/2000 | Kephart et al. | |
| 6,587,507 B1 | 7/2003 | Chui et al. | |
| 7,020,701 B1 * | 3/2006 | Gelvin et al. | 709/224 |
| 2001/0028683 A1 | 10/2001 | Bottreau et al. | |
| 2002/0159518 A1 | 10/2002 | Bottreau et al. | |
| 2003/0009332 A1 | 1/2003 | Heusdens et al. | |
| 2003/0058943 A1 | 3/2003 | Zakhor et al. | |
| 2003/0103563 A1 | 6/2003 | Amini et al. | |
| 2003/0108101 A1 | 6/2003 | Frossard et al. | |
| 2003/0165331 A1 | 9/2003 | Van Der Schaar | |
| 2003/0179825 A1 | 9/2003 | Sekiguchi et al. | |
| 2005/0015600 A1 | 1/2005 | Miyazaki et al. | |

OTHER PUBLICATIONS

Mallat et al., "Matching pursuits with time-frequency dictionaries", IEEE Transactions on Signal Processing. Dec. 1999, vol. 41, pp. 3397-3415.*

Tropp et al., "Improved Sparse Approximation Over Quasi-Incoherent Dictionaries," IEEE International Conference on Image Processing, Barcelona, Sep. 2003.*

Tropp, "Greed is Good: Algorithmic Results for Sparse Approximation," IEEE Transactions Information Theory, 2003.*

Mallat, S.G. and Zhang, Zhifang, "Matching Pursuits with Time-Frequency Dictionaries," IEEE Transactions on Signal Processing, 41(1993)3397-3415.

Bergeaud, F. and Mallat, S., "Matching Pursuit of Images," name of publication unkown, published by Academic Press, Inc. 1995.

Davis, G. and Mallat, S., "Adaptive Greedy Approximations," Contract Research Report sustantially identical to doctoral dissertation of Geoffrey Davis, New York University Graduate School of Arts and Science, 1994, Catalog No. LD3907.G7 1994.D38.

Leviatan, D. and Temlyakov, V. N., "Simultaneous Approximation by Greedy Algorithms," Report, funded by National Science Foundation Grant DMS 0200187 and Office of Naval Research Grant N00014-96-1-1003; not known whether this report was ever published; possibly "made available" as a preprint sometime during 2003.

Sieracki, J. M., "Greedy Adaptive Discrimination Signal Component Analysis by Simultaneous Matching Pursuits With Application to EcoG Signature Detection," University of Maryland Doctoral Dissertation; entered into University of Maryland Library cataloguing system in approximately Jun. 2003 but not shelved at that time. Dissertation was sent to bindery and was not shelved, and therefore was not available to the public, until a date no earlier than Apr. 2004. In addition, although the Copyright deposit date was Jun. 10, 2003, the Copyright Office reports that this dissertatio was never catalogued by the Library of Congress and never shelved. Hence its earliest publication date is Apr. 2004 or later.

Bultan, A., "A Four-Parameter Atomic Decomposition of Chirplets", IEEE Transactions on Signal Processing, Mar. 1999, 47, (3), pp. 731-745.

Sadler, B., et al., "Optimal and wavelet-based shock wave detection and estimation", J. Acoust. Soc. Am., Aug. 1998, vol. 104, Issue 2, pp. 955-963.

* cited by examiner

Primary Examiner — Marjorie Moran
Assistant Examiner — Anna Skibinsky
(74) Attorney, Agent, or Firm — Rosenburg, Klein & Lee

(57) ABSTRACT

A system and method whereby acoustic signals can be classified and identified as to nature and location of the original signal. The system and method determine from an arbitrary set of signals a signature or other characterizing feature and distinguish signals associated with a plurality of conditions by means of dictionaries comprising atoms of signals.

19 Claims, 10 Drawing Sheets

A)

B)

SYSTEM AND METHOD FOR ACOUSTIC SIGNATURE EXTRACTION, DETECTION, DISCRIMINATION, AND LOCALIZATION

CROSS REFERENCE TO RELATED APPLICATIONS

This application is a continuation in part of U.S. patent application Ser. No. 10/748,182, entitled "Greedy Adaptive Signature Discrimination System and Method," filed Dec. 31, 2003, issued as U.S. Pat. No. 7,079,986 on Jul. 18, 2006, and incorporated herein by reference in its entirety, and therefore claims priority therefrom to the extent legally applicable, and also claims priority from U.S. Provisional Patent Application No. 60/664,518, filed Mar. 23, 2005.

FIELD OF THE INVENTION

The current invention relates to pattern and signal recognition and discrimination. It further relates to acoustic signal processing, and more particularly to sensing systems in which one or more transducers receive a sound, vibration, or similar signal that must be detected and identified in an automated fashion. It further relates to systems in which certain signals or classes of signals must be discriminated from one another. It still further relates to localization of the source of such signals. This invention utilizes certain methods and systems previously disclosed in U.S. patent application Ser. No. 10/748,182, filed Dec. 31, 2003 and entitled "Greedy Adaptive Signature Discrimination System and Method" (hereinafter referred to as the GAD Application).

BACKGROUND OF THE INVENTION

Acoustic signals are derived from sensing the vibrations of a medium or object with an appropriate transducer. They may be recorded using microphones, hydrophones, or pressure sensors, or sensed indirectly through RF or laser vibrometry, optical interference, moving encoders, magnetic coils, or various other means. Acoustic signals typically comprise a one-dimensional time-varying signal that may be represented as a function, a voltage, a current, a pressure, a position, or so on, or may be sampled into a vector of digital numbers. Acoustic signals may also be grouped into multi-channel systems, which arise, for example, when multiple transducers are arranged to record the same signals using sensor arrays.

A "signature" is a pattern within a signal or data stream that can be associated with a condition of interest in the signal generating system. There are a host of applications for acoustic signature detection and discrimination. Acoustic signals may be indicative of a state of affairs: A failing transmission, a knocking motor, an irregular heartbeat, congested lungs, rainy or windy weather, the strain on a suspension mechanism, and the proximity of talking people are a few examples. Acoustic signals may also indicate the occurrence of an event: Breaking window glass, a roll of thunder, the report of a gunshot, the passing of footsteps, the failure of a bearing, etc. Acoustic signals may also be used to identify their source: Mr. Jones' voice, an passing tank, a terrorist's getaway vehicle, an electric fan, a French horn, the loading of a 9 mm pistol, a supersonic jet, a robin bird call, etc. The signal may be mapped to a class identity (e.g. is it a truck or a car?) or to a unique identity (e.g. is it Mr. Jones' car or Ms. Smith's car?). Acoustic signals may also be utilized to identify the location of the source. Acoustic signals of interest will arise in many fields and numerous specific examples will be obvious to one skilled in a particular field.

The human auditory system is extraordinarily good at this sort of detection and discrimination. Yet creating a reliable automated equivalent remains a challenge. A useable method must address several related goals: the signals must be translated into a representation that allows their manipulation and comparison; classes of signals must be compared in order to ascertain and extract characteristic signatures; a detector/classifier must be created to recognize signatures in a way that is robust to noise and environmental issues; and detected signatures must be localized in space. The GAD Application discloses a suite of methods that can accomplish these goals when embodied in the proper context.

In the present specification the abbreviations "GAD" refers collectively to the Greedy Adaptive Discrimination methods disclosed in the GAD Application. GAD comprises several aspects, including a Simultaneous Sparse Approximation ("SSA") algorithm referred to herein as the "GAD decomposition algorithm" or "GAD SSA", together with a system of signal representation and methods of processing that are reintroduced introduced as required in the text below. For clarity of description herein, the operational elements of the GAD Application are embodied in a separable module, referred to as a "GAD Engine", which can be utilized in various aspects to achieve signature processing.

"Sparse Approximation" is a term of art that refers to representing a potentially complex signal as the sum of a relatively small collection of component elements. "Simultaneous Sparse Approximation" is therefore the representation of each member of a group of signals in terms of a common, relatively small, collection of component elements. As disclosed in the GAD Application, the GAD decomposition algorithm in some embodiments permits the common collection of component elements to be similar rather than absolutely identical, thus increasing the utility of the idea. SSA as used herein includes all variations of GAD SSA contemplated by the GAD Application as well as any similar or equivalent decomposition methods that may arise in the art.

The present invention defines certain embodiments of GAD that are applicable to acoustic signal analysis, along with certain refinements and additional complimentary methods that may be utilized in building deployable acoustic sensors and processors. The methods and embodiments will also be useful in other applications in which similar needs arise.

SUMMARY OF THE INVENTION

The present invention comprises a novel method of processing, analyzing, and comparing acoustic signals in order to facilitate signature detection and localization. The process begins with collecting acoustic data that is representative of the signals to be detected. The data is normalized so that individual recordings are approximately comparable, and it is further divided into classes. Each class comprises multiple recordings of a particular event of interest. A simultaneous sparse approximation is performed on the data and parametric "mean" signals are generated for each signal class. The method incidentally corrects for and removes parameter jitter between signals. The parametric means comprise a collection of time-frequency atoms that represent a "typical" signal in the class.

The parametric means may, in some embodiments, be compared to each other in order to further reduce the dimensionality of the representations. For example, only those signal components that distinguish between classes may be kept and other components, common among the classes may be discarded. In certain embodiments, the components may be diagonalized in order to achieve an orthogonal representation. In any case, by noting components that distinguish between signal classes, and/or noting class-typical values of components that are common among multiple signal classes, the invention establishes unique signature discrimination criteria.

There are several possible embodiments of a detector that utilizes the newly ascertained signature information. In some embodiments, the deployed sensor will utilize extracted parameters from the signatures to define a spectral filter corresponding to each signature. In other embodiments, the deployed sensor will directly utilize the collection of atoms that describes the signature, by comparing these to a similar analysis of any new signal. One embodiment of such a detector is to generate a dictionary that contains compound atoms representative of the signatures of interest and utilize a nearest neighbor metric. In certain embodiments, the parametric means will contain enough information to reconstruct an "average" signature signal in the original time domain. This reconstructed signature signal or the collections of signature components may be compared with any new signals by a host of well-known means, or by novel means elaborated in the GAD Application and below.

The problem of localization is addressed in two ways: by comparing amplitudes and by comparing time and phase information. All else being equal, a louder signature is generally closer than a quieter version of the same signature. R-squared power relationships are utilized to make rough comparisons, and these can be normalized to the environment. Furthermore, when multiple transducers with known, separate positions record the same signature signal, timing and phase information may be utilized to predict the source location. The invention makes available time and amplitude information that may be utilized by other known methods, or utilized by specific processes disclosed here.

The combination of detection and localization presents additional challenges. One embodiment of the present invention works by sequential operation. A signal recorded by one or more sensors is normalized and compared to the signature database. If there are multiple transducers, several possible embodiments are available. In a first, each channel is compared individually to the database and a weighted decision metric makes the final determination. In a second, the signals are cross-correlated to phase align them and the summed (or averaged) signal is compared to the database. In a third, the signals are analyzed using the GAD sparse approximator (as disclosed in the GAD Application) and phase-aligned and de-jittered by taking a "parametric mean"; the "parametric mean" signal is then correlated to the dictionary. There are benefits and drawbacks to each method. The last method offers specific advantages, for example, when distributed sensors are only approximately located or have free running data clocks, both of which introduce unknown variation into timing and position information. Once a signature is determined to be present and (if necessary) has been properly classified, it is then located within the recordings from each individual channel. The relative phase, timing, and energy (amplitude) information is analyzed across channels to localize the source. The signal may be located within each channel by a host of well-known methods, including for example cross-correlation or pattern search. It may also be located, in certain embodiments, by extracting parameters directly from the GAD sparse approximator output rather than performing an additional calculation. Finally, in another novel embodiment, location characteristics may be learned by the system in the same manner as signatures are discovered by exposing the sensor(s) to a variety of different signatures in different locations.

Further details of certain embodiments of the invention are set forth in the accompanying drawings and the description below. Other features, objects, and advantages of the invention will be apparent from the description and drawings, and from the claims.

DETAILED DESCRIPTION OF PREFERRED EMBODIMENTS

Figure 1A:
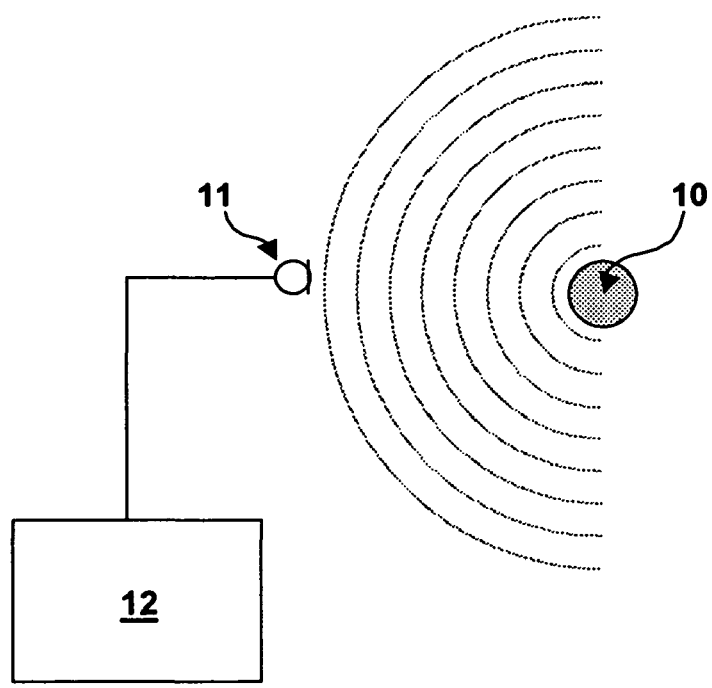
FIG. 1 illustrates an elementary acoustic sensing system in an ideal environment, and a multi-channel acoustic sensing system in a complex environment.

FIG. 1A depicts a simple, idealized schematic of an acoustic sensing system. A sound source 10 radiates acoustic energy through a medium and a microphone (or other appropriate transducer) 11 converts the detected vibrations into electrical energy. A processing device 12 amplifies, preconditions, and evaluates and/or stores the resulting signal.

Figure 1B:
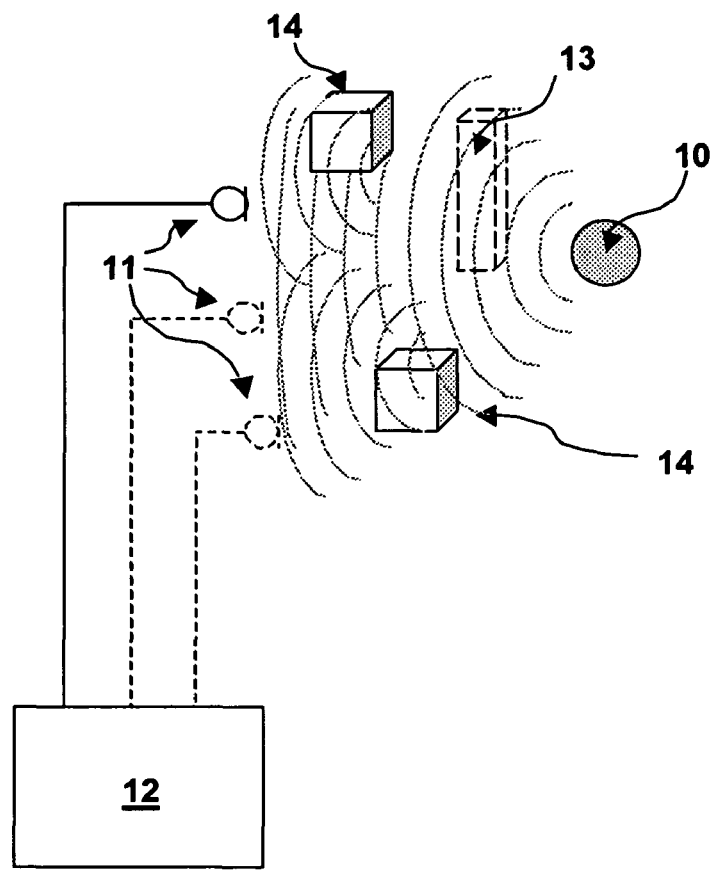

FIG. 1B depicts a more realistic scenario and illustrates the complexities of the real world problem. Again, a source 10 radiates acoustic energy. However other media with varied acoustic properties now interrupt the smooth transmission medium. Examples include inhomogeneous regions such as 13 that absorb and refract energy, possibly in frequency dependent ways; and reflective objects 14 that bounce and scatter energy. The multi-path wavefronts combine at the microphone (or other transducer) 11 to obscure the source acoustics. This second picture depicts optional additional transducers that independently sample the acoustic energy at multiple points. The transducers 11 may be identical, or may differ from one another in operation or response characteristics. Frequently they are located in a regularly spaced array in order to allow the processor 12 to focus its attention in specific directions using phased-array beam forming; however, this is not a requirement. The transducers may also be randomly spaced, in which case 12 must know their relative locations in order to extract coherent information through comparison. The transducers may even be in motion, relative to each other and/or relative to the acoustic source.

If the transducers are not at known relative locations, one mechanism for aligning the signals temporally and calibrating the system is to transmit localizing information (such as differential GPS) to 12. Another method is to utilize a known source of acoustic emissions and extract phase and time differences from the signal arrival times at each transducer. Another novel method, afforded by the methods disclosed in the GAD Application and below, is to extract a matched signature pattern from uncontrolled emissions using the subject GAD methods and extract the timing information from the parameters of matched atoms. (See below.)

These schematic figures are abstracted and actual systems will have specific features suiting their application. For example, distributed sonar buoys or towed array hydrophones might be used underwater. Unattended acoustic ground sensors might be placed by hand, dropped, or launched onto a battlefield or other site of interest. A building might be equipped with detection apparatus for security purposes. A laser might be focused on a distant structure to detect its vibrations. A roadside microphone might record passing vehicles. A computer might be configured with one or more microphones to interpret speech. A stethoscope might be adopted to detect body sounds. Other applications and equivalent systems will be apparent to those skilled in the art.

GAD Summary

Figure 2:
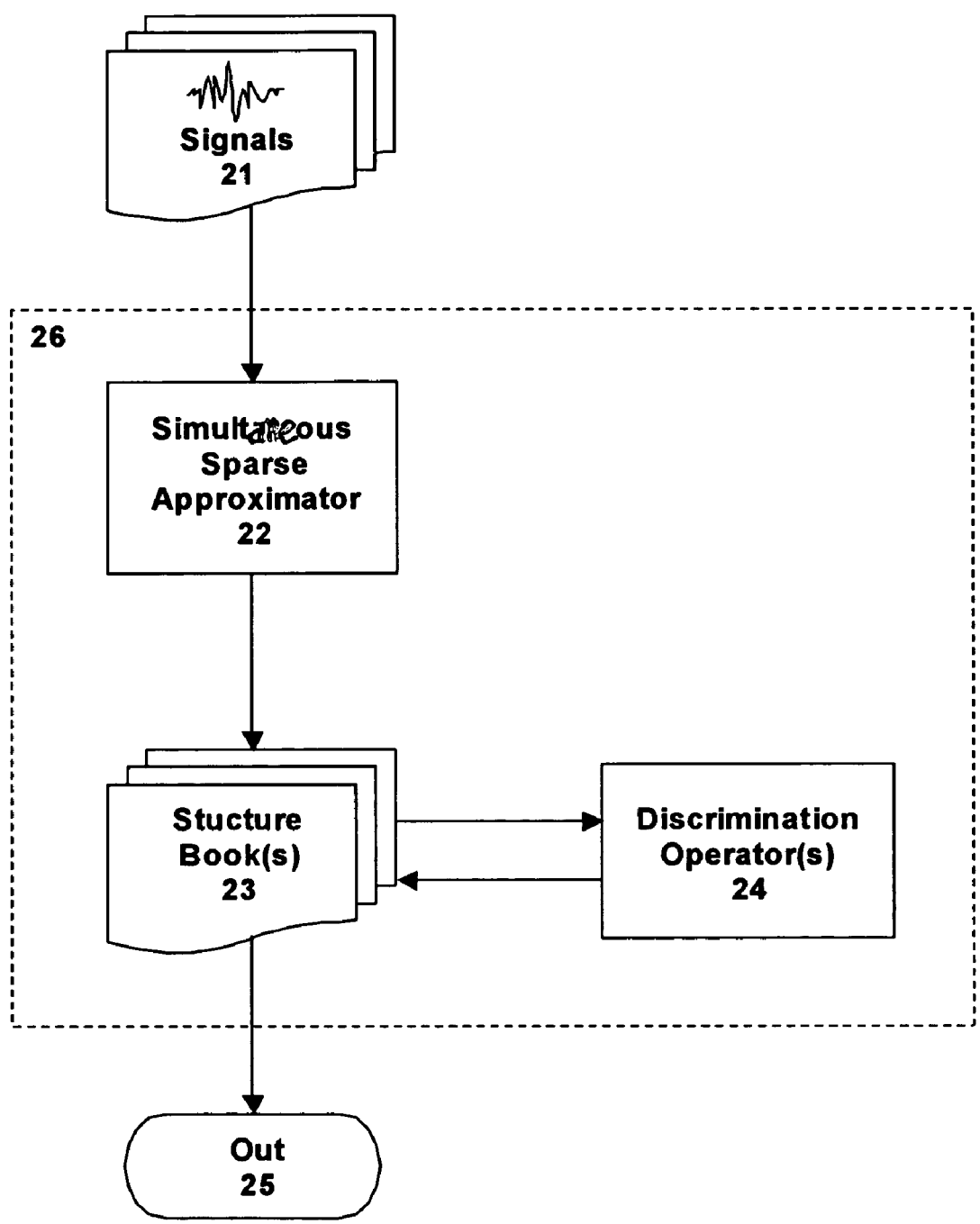
FIG. 2 is a schematic representation of a GAD engine.

In FIG. 2, we summarize schematically the central elements of the GAD methods disclosed in the GAD Application. The dotted region 26 represents a "GAD engine", comprising a Simultaneous Sparse Approximator ("SSA") 22, a structure book memory system 23, and one or more discrimination functions 24 that operate on the structure books. The SSA 22 takes as input a plurality of signals 21 and produces a structure book for each signal. The output of the SSA will comprise one or more structure books sub-selected or otherwise processed as described hereafter and/or previously in the GAD Application. A structure book describes a linear decomposition of the signal and comprises a list of coefficients and a corresponding list of atoms for the decomposition. We may write the a signal f(t) as, $$f(t) = a_0 g_0(t) + a_1 g_1(t) + \ldots + a_n g_n(t) + R,$$

where $a_i$ are the coefficients and $g_i(t)$ the atoms, or prototype-signals of the decomposition, and R is the residual error (if any) after n+1 terms. If R=0 then the representation is exact, otherwise the decomposition is an approximation of f(t). One way to write the structure book is as a set of ordered pairs, ($a_i$, $g_i(t)$); however, we need not record the atom $g_i(t)$ itself. Descriptive information stored in the structure book may comprise the atom itself, a coded reference to the atom, or one or more parameters that uniquely define the atom; memory efficiency, speed, and convenience of accessing the atom and/or its properties will dictate the choice. The $g_i(t)$ belong to a dictionary D of prototype signal elements, more fully described in the GAD Application.

The dictionary is an intrinsic element of the SSA as described in the GAD Application and hence is not shown explicitly in all figures herein. In certain SSA implementations, the dictionary may be implicit rather than an explicit separable component. Where a dictionary becomes relevant to the functional description of a figure, it is broken out explicitly from the SSA block for explanation purposes. In general, structure books are created relative to a dictionary D and subsequent operations are performed based on this implicit relationship. A structure book may be recast into another representation by mathematical projection operations well known to those skilled in the art, in which case the elements $g_i(t)$ and the coefficients $a_i$ used in the structure book may change. In some cases these new $g_i(t)$ will belong to the original dictionary D, in other cases a new dictionary will be used. The illustration or lack of illustration of a particular dictionary D in describing a subject process herein is for convenience and is not a limitation of the invention.

The SSA produces structure books for each signal in the input collection 21 such that the atoms of any structure book may be compared directly to those of any other. In the simplest case, as disclosed in the GAD Application, the atoms may be identical for all signals in the collection. However, GAD SSA is also able to produce atoms that are "similar" as judged by the algorithm rather than identical; this novel feature is advantageous in many implementations because it allows the algorithm to automatically account for noise, jitter, and measurement error between the signals 21. See the GAD Application for details on methods for implementing SSA. Algorithms that produce similar simultaneous approximations for a group of signals may be substituted with appropriate adjustments. The atoms selected will vary depending upon the SSA implementation. Furthermore, the output of any such SSA may be further processed (e.g., to orthogonalize the atoms in the structure books) without departing from the spirit and scope of the present invention.

The general GAD SSA disclosed in the GAD Application permits the range of "similarity" between atoms across structure books to be controlled by setting a search window for each of the parameters of the dictionary. The windows may be fixed in advance for each parameter, or may be adapted dynamically. One adaptation that is sensible, for example, is to adjust the search window according the classical uncertainty principal; for example, appropriate search windows (and step sizes) for time and frequency might co-adjusted based on the time or frequency spread of the atom. The purpose of the variation is to associate similar by not identical atoms in an automatic fashion, and many possible windowing schemes will fall within the general mechanism disclosed.

One detail of the SSA implementation described in the GAD Application is the dictionary from which atoms may be selected. For illustrative purposes, certain embodiments herein disclosed will utilize a Gabor dictionary as defined in the GAD Application, comprising modulated, translated, and scaled Gaussians, combined with Fourier and Dirac delta bases. This example dictionary in no way limits the scope of the invention, and any other reasonable collection of prototype signals may be substituted, including in certain embodiments a dictionary of random prototype signals. The dictionary may be orthogonal, such as a Fourier basis, or not. It may be redundant, such as a collection of wavelet packet bases. It may also be highly redundant, as is the Gabor dictionary described. Certain advantages of speed may be realized with sparser dictionaries; however, redundancy will often increase the SSA's ability to generate a sparse approximation. In this case "sparse approximation" means an approximation that is reasonably close to the signal while containing relatively few terms in comparison to the length and complexity of the signal.

The post SSA discrimination functions depicted generically as block 24, are a class of operations that utilize one or more existing structures books in order to create new structure books. Certain operations will expand or reduce the number of structure books recorded in memory 23, while others will simply replace or modify existing ones.

One such basic operation is summation, in which the coefficients of one or more structure books are added together to create a new structure book. This idea can be used to generate an "average" by summing a set of N structure books and dividing summed coefficients by N. In the event that an SSA is employed that produces similar rather than identical atoms for different signals, the parameters of each atom in the various structure books may be averaged as well to produce a "parametric mean" structure book. See the GAD Application for more details. Two structure books can likewise be subtracted in order to calculate the difference between them.

Another example operation is thresholding. The coefficients of a structure book are compared to a set value, and the atom (or in certain embodiments the entire structure book) is discarded if it is below (or above) that value. Thresholding may also be based on parameters of the atom; it may likewise be based upon absolute values of coefficients or parameters; or may be based upon relative variance from a defined value or distance from a group mean. This latter may be extended to cluster analysis techniques. Again, see the GAD Application details for other details; specific examples are utilized below.

Various sorts of thesholding may be used to either reduce the dimensionality of the representation by eliminating atoms, or it may be used to classify signals based upon the different values of their coefficients or atom parameters. Note that using absolute (or squared or other even powered) measures rather than signed values is important when magnitude or energy of a component is established as a decision criteria, whereas using actual valued (or odd powered) measures retains sign of the comparison and is important when the direction of excursion is established as a decision value.

In addition, structure books may be treated by other methods to reduce dimensionality. For example, if the structure books are drawn from a redundant dictionary, it may sometimes be useful to orthogonalize the representations by generating new atoms using a gram-schmidtt type process. It is also possible to operate on a structure book to collapse one or more dimensions of multi-parameter atoms. This is illustrated in the GAD Application for the case of collapsing a class of signals across time in order to compare certain classes of time-correlated signals with randomly correlated background activity.

Taken together, the GAD Engine components define a very flexible tool for manipulating and discriminating signals. Further examples are illustrated in the GAD Application and below. One unique benefit of the certain SSA methods disclosed in the GAD Application is that the resulting structure books may be averaged, subtracted, or otherwise manipulated and any derived structure book retains sufficient information to reconstruct a representative, model signal in the original signal space. In particular, this means it is possible to calculate a parametric mean of a class of signals and then reconstruct a "typical" signature signal from that data for further analysis, comparison, etc.

Preconditioning

Acoustic data collected by means of a transducer system, such as those illustrated in FIG. 1, must in general be preconditioned. At a minimum, the electrical data will typically be amplified to make it usable in further processing stages. It will also be limited, in order to prevent damage to the system from excessive input levels. It may be compressed with an automatic gain control system, or other means in order to normalize the energy envelopes. It may in addition be filtered to remove noise, or to highlight frequency bands of particular interest in the application. It may also be gated in various well-known ways to remove noise. These and other preconditioning operations may be accomplished either in analog circuitry or digitally after sampling the signal. Many systems will utilize both mechanisms, because on the one hand it will in general be necessary to optimize the analog signal for sampling while on the other, digital operations are often more flexible and convenient.

Most, but not all, embodiments will sample this signal using an A/D converter and process the resulting data digitally using various commonly available DSP or computer architectures. Sampling must be at a sufficient rate to exceed the Nyquist requirements of the highest frequency components of interest in the data. Bit depth must be sufficient to allow dynamic range for likely excursions of the acoustic data, and for discriminating signatures in a noisy environment. Multi-rate and multi-bit-depth systems may be employed in order to economize or speed operation in certain embodiments; for example, digital filtering, compression and limiting may be applied before down-sampling the signal into a more compact data type for comparison processing and other operations.

In the event that the system will be used to analyze non-stationary signals, or transients, it becomes necessary to perform a rough time alignment of incoming signals to a standard format. This may be accomplished, for example, by envelope triggering, either in analog or digital domains. This rough alignment serves the purpose of making one signal more comparable to another for purposes of signature extraction or detection. Otherwise, in a randomly windowed time sample, a given signature or signal component of interest might be chopped off and thus rendered difficult to detect or in the worse case invisible to the detector. Rough time aligning by some means is generally preferable to using excessively long time windows, because it reduces memory usage and speeds processing.

Preprocessing is not a strict requirement of the subject invention, and its necessity and details depend upon application. The different aspects herein discussed will be integrated only as appropriate to a particular embodiment.

Signature Discovery and System Training

In an ideal world, acoustic signatures of interest would be well known, easily recognizable patterns, which are repeated nearly perfectly each time they are emitted. In rare instances, this may hold. However, in practice, even the highest tolerance mechanically produced sounds and vibrations will vary from instance to instance. Diffusion and intervening reflective and refractive media interfere with and dynamically distort the signal; background noise arises; measurement error and time jitter occurs; and so on. Furthermore, it may not be at all clear a priori which characteristics of a signal distinguish it from either the background noise or from another signal of interest. Therefore, signatures must be identified and extracted from collections of data.

Figure 3:
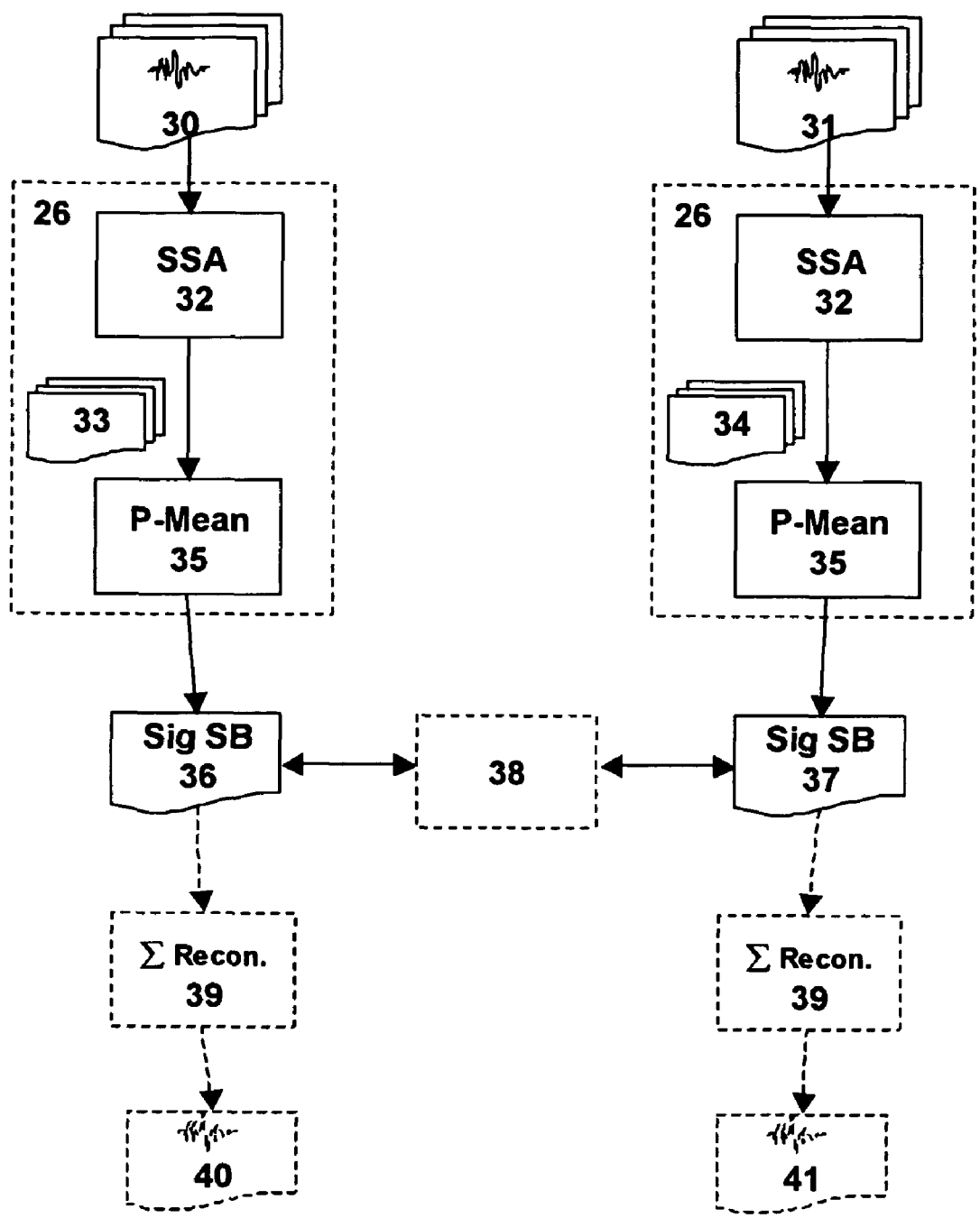
FIG. 3 is a flow diagram of a first method of signature extraction.

One subject process for signature discovery is illustrated in FIG. 3. It begins with sampling a collection of audio segments, each of which is preconditioned to contain one similarly sized instance of the sound of interest. The segments may be further preconditioned as described in the previous section. The audio segments are divided into classes, where each such class is a collection of sample segments of only one type. For example, if we were training the system to distinguish 6-cylinder from 8-cylinder engines, then one class would contain only 6-cylinder engine samples and the other class only from the 8-cylinder samples. Likewise, if we were training the system to distinguish a hand clap from a gunshot, then one class would contain samples of handclaps, and the other samples of gunshots.

In the method illustrated in FIG. 3, two classes of signals, 30 and 31, are analyzed. However the method may easily be extended to any number of classes and this depiction is not meant to limit the invention. Each individual class is analyzed separately by performing the following operations: First the SSA 32 creates a collection of matched structure books (33 or 34) from the signals (30 or 31). Next a parametric mean operation 35 is performed on the matched structure books to produce a signature structure book for each signal set (36 and 37). If the SSA produces structure books with identical atoms for each signal in a class, then the parametric mean reduces to just an average of the coefficients. However, if the general GAD SSA is applied to produced similar rather than identical structure books for the signals within a class, then the parametric mean will include an appropriate averaging of the parameters of the respective atoms.

Optionally, the structure books 36 and 37 may be compared with each other at this stage to reduce the dimensionality of the representations by extracting discriminating elements. This is illustrated with the optional dotted box 38. The idea is better facilitated by a second signature extraction method described in FIG. 4; hence, the sub-process of block 38 is addressed below. Note that within the structure books 36 and 37 produced by the present process, each coefficient $a_i$ and each atom $g_i(t)$ are directly comparable for a fixed i only within the class the structure book is associated with; but atoms in 36 are not in general the same as atoms in 37. (There are special cases, e.g. use of orthogonal dictionaries, wherein 36 and 37 will be atom-compatible.)

The resulting parametric mean structure books 36 and 37 produced by the extraction process may be utilized to represent the signatures in a compact form. Alternatively, the structure books 36 and 37 may be used to reconstruct model signals for each class. The process of reconstruction, block 39, involves summing the components represented by the structure books, in the manner of the linear combination described in the GAD summary above and further in the GAD Application. The output of the process is a "signal" representative of each class. If reconstructed, then these "typical" signals (40 and 41) may be construed as signatures and lie mathematically in the same signal space as the original acoustic; hence, they may be directly manipulated just like an acoustic signal. The reconstruction is illustrated using dotted boxes, since it is an optional part of the process. However, because the process just described generates structure books 36 and 37 that are not directly comparable, the optional reconstruction of 46 and 47 will often prove useful in further processing. Use of these signatures for detection is addressed below.

Figure 4:
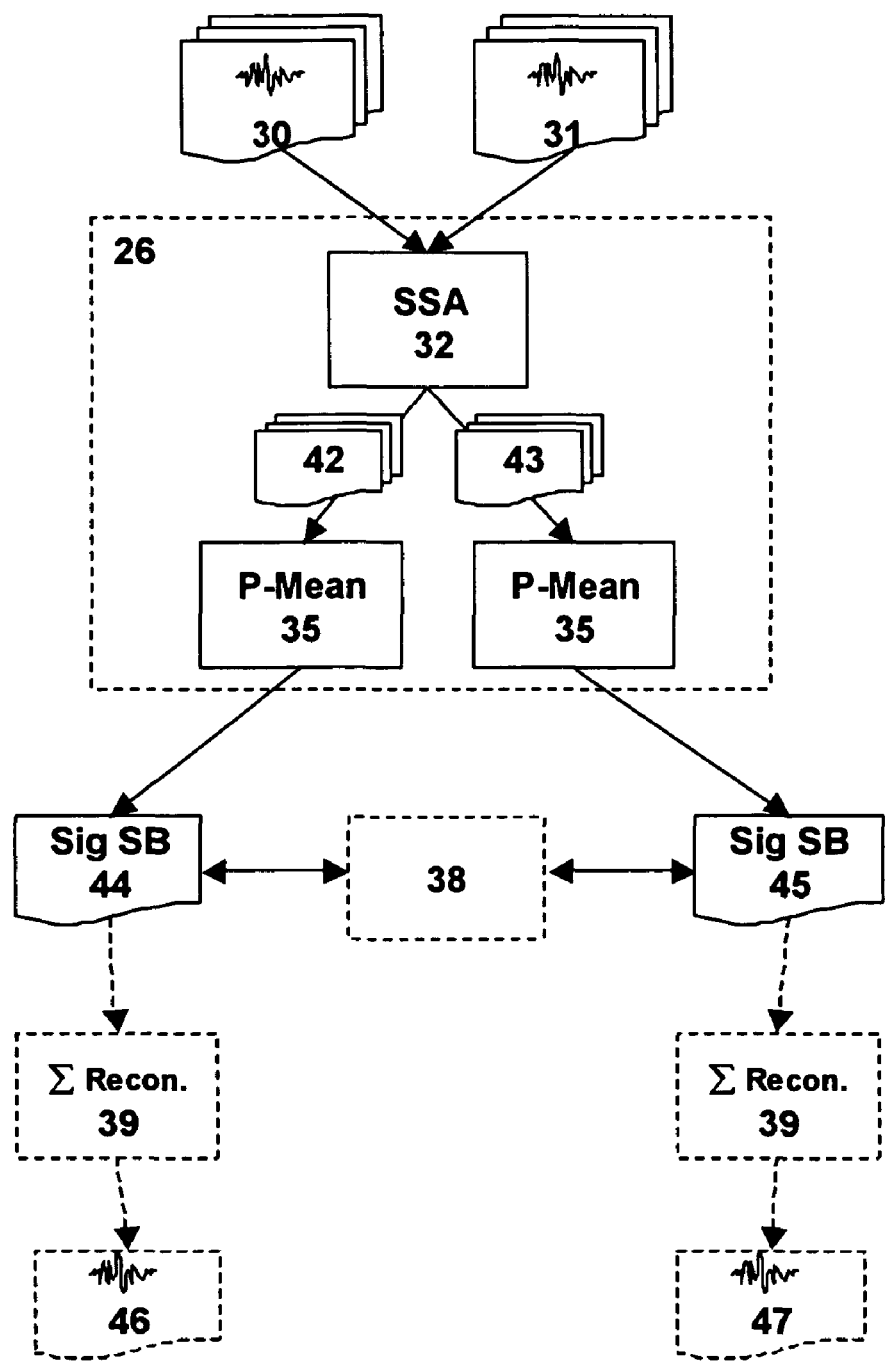
FIG. 4 is a flow diagram of an improved method of signature extraction.

A second process for signature discovery is illustrated in FIG. 4. It also is illustrated for only two classes, but may be similarly extended to any number and this schematic should not be interpreted to limit the invention. The process begins similarly to that above, by sampling and precondition audio segments. Again, the segments within the collection are divided into classes based on their origin. The method illustrated in FIG. 4 differs, however, from the previous process in that all classes are combined and analyzed simultaneously by the SSA 32. The resulting analysis has the important advantage that the structure books (42 and 43) for both (all) signal classes are now directly comparable. Each coefficient $a_i$ and each atom $g_i(t)$ are directly comparable for a fixed i, regardless of which class the structure book is associated with. This novel advance was introduced in the GAD Application.

Optional block 38 again illustrates that the structure books 44 and 45 may be compared and further analyzed in order to reduce dimensionality or otherwise improve their usefulness in later detection and discrimination applications. Signature structure books generated by either the first (36, 37) or second (44,45) method may be compared; hence, the following applies to structures books generated by either of the illustrated processes, or by any similar process. The process diagramed in FIG. 4 guarantees that the structure books 44 and 45 share atoms, and hence simplifies and speeds the inter-comparison. To utilize independently generated structure books 36 and 37, an additional process must be applied within 38 to match "similar" atoms with one another across the two sets. This may be archived by nearest neighbor matching between the sets. It may also be achieved by transforming the atoms into a common representation space using an additional GAD process, pursuit, orthogonalization technique, or another decomposition process. Another option for relating one independent atom to another is to transform the signals into the time-frequency plane (or other higher dimensional representation) and compare data there. Still another option for relating atoms to one another is to drop one or more parameters; for example, time and phase information may be dropped to form larger equivalence classes if this information is not germane to the signals of interest. These alternative methods are contemplated within the present invention. We assume without loss of generality, therefore, that independently generated structure books have been mapped to each other in order to (a) ascertain a correspondence between similar atoms and (b) a ascertain a list of remaining, non-similar atoms with no counterparts in the other set(s).

There are two related goals that must be addressed in processing the raw signatures. The first is selecting components that reliably discriminate the signature from background noise—this may be termed "detection." The second is discriminating one signature from another in order to classify new signals that are detected; this may be termed "discrimination." In both cases we wish to reduced the dimensionality of the structure book to the smallest set of atoms that allow us to reliably achieve our goal. In certain embodiments, extra atoms will be retained in order to add redundancy and/or robustness to the system; however, in general this overhead is undesirable since it slows operation of the system and increases memory requirements. Furthermore, by keeping components with comparably large coefficients, we help minimize noise from truncation and round-off errors in our detector.

As disclosed in the GAD Application, the method of reducing the dimensionality of the structure book signatures will depend on application. Certain useful embodiments are detailed here, without intending to limit the scope of the invention. The problem of "detection" and distinguishing signatures from background noise is addressed in the next section. The remainder of this section addresses discrimination between signatures. Again, most examples are given for discrimination between two signatures, but the method may be clearly extended to any number of signatures by treating them pair-wise.

In certain embodiments, atoms that are matched to other similar atom in other structure books will be eliminated from both structure books, since they do not contribute to the discrimination. In order to accommodate noise, we define "similar" as those SSA matched atoms that have similar energy (coefficient magnitudes) in both structure books. Atoms that appear strongly in one signature structure book and weakly in the other are retained. This may be achieved by various search methods and is related to a set theoretic subtraction (or "relative complement") operation, f1\f2, where f1 and f2 are the signature structure books of interest. Another embodiment of this idea is to take a difference between the matched structure books of the two signatures, subtracting the energies in one from the energies in the other. A second embodiment is to square each coefficient before the subtraction in order to ignore the sign of the atom. This should be decided with caution, since in certain cases one signal class may differ from another signal class simply in the sign of one component. (Consider, for example, an embodiment that analyzes phase-encoded signals such as used in BPSK or QPSK.) The appropriate difference $f1\backslash f2$, $f1-f2$, $f1_i^2-f2_i^2$ for $i\epsilon[0 \ldots n]$, etc., between signatures, however arrived at, will represent those components that strongly present in f1 and not in f2. The reverse difference, e.g., f2–f1, represents those components that are strongly present in f2 by not f1. Additional details appear in the GAD Application. By utilizing these reduced dimensionality signatures, the classes can be discriminated without wasting computation efforts on measuring common components.

One embodiment for distinguishing one signature from a large collection of signatures will proceed similarly as follows: A difference is formed between the first signature f1 and each other signature in the set, as described above. The resulting difference structure books are then analyzed to establish which, if any, atoms they have in common. In certain embodiments, a classification decision tree can be created from the structure books and a detector may be designed based upon the result. (See below.) In another embodiment, each of the pair-wise reduced dimensionality signatures will be simply utilized independently in the dictionary of the detector. In still another embodiment, the set of pair-wise difference structure books will be merged. This last method is undertaken by taking the logical union of atoms of significant energy in the collection of difference structure books. This union represents the minimal set of component elements that must be detected and measured in a new signal in order to distinguish it uniquely from its peers. The process successfully reduces the dimensionality of the detection problem.

As a result of applying one or more of the above methods, those component atoms that are unnecessary for distinguishing a signature from one or more other signatures are eliminated from representation, and therefore eliminated from consideration in the detection methods that are detailed below. It certain embodiments, the explicit subtraction operation can be replaced with a sequential "search and compare" operation over the set of atoms and the set of signature structure books.

An additional method for reducing the dimensionality of the representation is to collapse atoms across one or more parameters. For example, a Gabor dictionary of acoustic prototype elements is naturally parameterized by time, frequency, scale, and phase. In certain applications it may be determined that the phase of a component is unimportant, hence those atoms that are selected by the SSA may be treated as identical for analysis purposes if all other parameters are similar except for phase. (Note that the certain GAD methods disclosed in the GAD Application automatically equate similar elements with each other and are useful for this purpose.) Likewise, it may be determined that the time of onset is unimportant; this may occur for example in continuous, stationary signature signals. Therefore atoms may be collapsed across time. (The next section treats one method of achieving this in the context of background noise.) For any parameter, equivalency sets may be established, expanded, and applied in implementing the methods herein disclosed.

At any stage in the disclosed methods it is possible to reprocess the representations in certain ways that will, in some embodiments, make the process faster or have other advantages. For example, the structure books may be orthogonalized by a Gram-Schmidtt or similar process in order to express data in a minimal orthonormal basis. In certain circumstances, this will have benefits for detection, comparison, or other processing. The structure books may also be transformed into a known representation, such as a Fourier or Wavelet basis. Orthogonalizing the representations may, for example, ease the removal of common components from two or more structure books. To avoid re-orthogonalization, the SSA methods disclosed in the GAD Application are easily specified to automatically generate orthogonal representations by utilizing an orthogonal (rather than a general) matching pursuit. Thus the structure books will "automatically" orthogonal. This is contemplated within the scope of the GAD Application. However, it is not always desirable. Redundancy often achieves more meaningful representation of the data, more options in later processing, less susceptibility to round-off and truncation errors, and can generate more robust representations in the face of noise and measurement error. Furthermore, orthogonalizaton can be slow; hence, if it is necessary it will often be efficient to wait until the dimensionality of the data has already been reduced. Orthogonalization may be achieved by using an orthogonal dictionary, by using an orthogonalizing SSA or by post-processing the structure book(s). All of these are contemplated.

Returning to the signature extraction method of FIG. 4, optional process block 39 may be applied to reconstruct the structure books into signature signals, 46 and 47 by summing the represented structure book components. Whether or not process 38 has been applied to reduce or modify the structure books 44 and 45, reconstruction 39 will still operate similarly.

However, the methods described so far for signature discovery and training do not required that the signal be reconstructed. The problem is instead being attacked in a low dimensional representation defined by the structure book(s). In many embodiments, this gives advantages of tractability and robustness. At any point, however, the signature signals may be reconstructed from the structure book representations. These time domain signals can be utilized directly by certain detector designs. (See below.) Time domain representations will be most useful in representing one-shot time course signals, or transients, where the phase and time become a component of the signature. When signals of interest are continuous and stationary, then dictionaries that disregard time envelope information will generally be more useful; and in some cases, disregarding phase will also be appropriate.

Signal Detection and Background Noise

Background noise is a common and ever present problem in acoustic signal detection. Self-noise from microphones, amplifiers, and sampling circuits forms a relatively stationary backdrop for all recordings. If sensing and sampling equipment for training differs from that used for deployed detectors, compensation must be built into the system. Environmental background noise is an even more significant problem, since it will change from environment to environment, and from time to time within environments. Procedures may be followed to readjust detectors accordingly at training (signature discovery), on deployment (signature detection), and even dynamically over time. The procedures are related, and in many cases similar.

Basic electronic noise suppression is well known to those skilled in the art. A single channel noise gate may be triggering by sound envelope patterns or thresholds; multi-band gates may also be employed. More advanced noise reduction may be achieved digitally by utilizing Fourier, wavelet, or other basis or frame decompositions and thresholding the resulting coefficients. Any of these may be utilized to precondition the signal during training and/or during detection, and will be applied within certain embodiments of the present invention.

An additional technique may be applied within the GAD engine. Suppose a signature has been established for a class of signals and reduced to a parametric-mean structure book. (Or, if only one-signal has been sampled, simply suppose we have generated an appropriate structure book.) By thresholding the coefficients associated with the structure book atoms, in energy (e.g., squared or absolute values) we effectively gate noise by eliminating the weakly represented atoms.

We can automate the thresholding process as follows: Suppose that the atoms of the dictionary are smoothly parameterized in time (e.g. Gabor atoms). Suppose that we have collected a training corpus of "background" noise samples of similar length to the signal recordings. One may take each atom in the structure book and shift it through all possible locations in time, comparing it via an inner product to each background sample in the collection. This process is akin to a correlation operation, in the representation space of the structure book. By taking an RMS (or other mean) across all background samples and all positions for each atom, we arrive at the "typical" amplitude (or energy if we use the squared value) for any given atom within the background noise. This process and variations on it are disclosed in further detail in the GAD Application. The "typical" background energy (or amplitude) of each atom may be utilized to threshold the energy (or amplitude) associated with atoms in any structure book. Those atoms represented with sufficiently large coefficients are considered to be above the level of background noise, and contribute to the signal of interest. Those that are weakly represented are removed, reducing the dimensionality of the structure book.

This process may be applied during training to eliminate recording system self-noise from derived signatures. It may be applied in any specific new environment to threshold signals and/or signatures against background noise. It may be applied periodically by user input, or by an automatic process, to continually recalibrate the system against changing background noise.

When background noise increases in the field, the detector may be recalibrated to ignore atoms with energy below the background threshold. Any structure book representation of a signature may be thresholded and those atoms that are too small to detect may be eliminated for comparison purposes. This increases decision robustness and decreases processing overhead until the background noise again drops. The same process may be applied, either independently or simultaneously, to a newly sampled test signal.

Furthermore, if non-GAD detectors (either digital, or analog) are employed within the system, then atoms below noise threshold may be mapped to appropriate detectors by referring to their descriptive parameters—for example, a Gabor atom may be mapped directly to a filter of specific frequency and bandwidth.

Signal Detection, Discrimination, and Classification

Figure 5A:
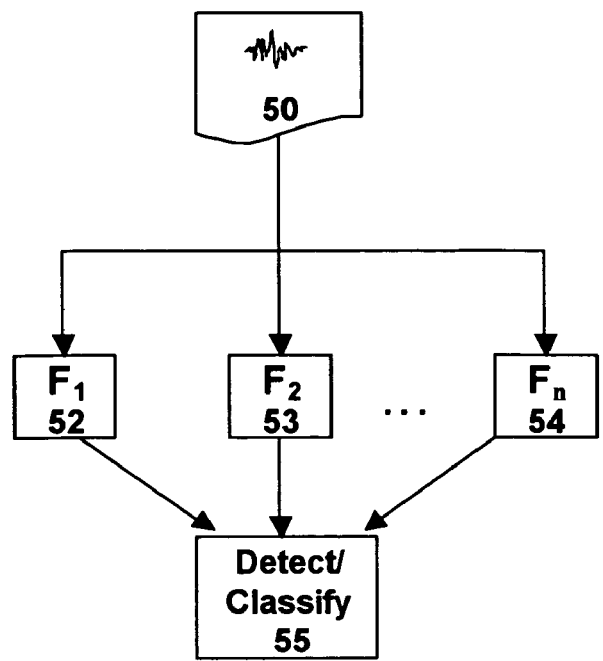
FIG. 5 is a flow diagram of a general detector/classifier mechanism, together with a flow diagram for a method of implementing feature detection with the subject invention.

Detector/Discriminator mechanisms operate by examining the signal for features of interest. FIG. 5A illustrates the concept. The new sample 50 is analyzed either simultaneously or sequentially by a set of feature detectors 52, 53, 54, the output of which is either a binary true/false, or a weighted value proportional to likelihood or magnitude of the feature in the signal. Any number of detectors may be included, only three are shown for illustration. The outputs are compared 55 to determine if a signature is present, and/or classify it. The feature detectors in various embodiments respond to frequency components of various bandwidths, scale components, phase components, time localized components, etc., in any combination. As a simple example, a filter bank can be utilized to detect the presence of a continuous signal with certain characteristics. One may extract from the atoms of a signature structure book those parameters that are relevant to detection. Utilizing the methods described in the GAD Application and in the present document, "features" can comprise any characteristics that differentiate between atoms of the dictionary. Thus complicated features may be discovered and extracted by utilizing an appropriately constructed dictionary.

Figure 5B:
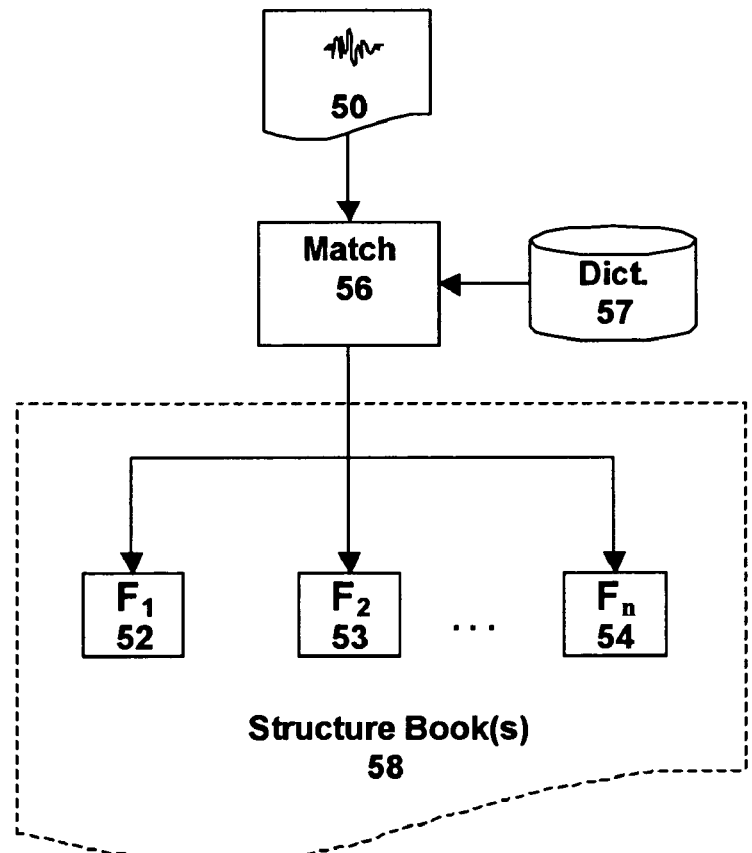

FIG. 5B illustrates further applicability of the present methods. A signal 50 is matched by some process 56 to a dictionary 57 of possible choices. This matching process may be an SSA, a matching pursuit, or another decomposition; it may be a correlation operation; or it may be any of numerous other methods known to those skilled in the art. The process utilizes a dictionary of features, e.g. signatures or atoms of interest. The output is structure book 58 (or equivalent), from which proportional matches to each feature (52,53,54, etc.) are extracted.

Note that we have made the dictionary explicit in this a certain other figures, since the dictionary is specifically being discussed. In certain other figures wherein the dictionary (if any) is implicit to the SSA block, it is not illustrated separately.

Detection and discrimination methods depend somewhat upon the nature of the signature of interest. Transient, or time-limited signature patterns fit entirely within a sample window. In this case, the absolute time course and envelop aspects of the signals become part of the detection and discrimination process. In contrast, continuous or near stationary signals do not fit within a sample window and hence the window comprises a (possibly random) sample of the emissions. In this case, absolute time course and envelope aspects of the signal have less bearing on the detection and discrimination process, and frequency domain components together with periodic (or quasi-periodic) patterns typically comprise the bulk of the signature information. Note, however, that a reconstructed "typical" waveform may still be useful even for the latter class of signals: if that waveform segment is repeated periodically, then it can be detected by the methods below no matter where it appears in the sample window. The methods are described first in the context of using reconstructed signature dictionaries; they are subsequently generalized below.

One method of detection and discrimination is as follows: Construct a dictionary of reconstructed signature waveforms. Find the cross-correlation of each dictionary waveform with each new sample window. Examine the peak value of the cross-correlation function and apply a threshold to determine if a signature is present. The best-correlated dictionary element is the likely candidate. The cross-correlation peak, incidentally, also provides arrival time information that may be utilized for localization. (See next section.) The threshold(s) may be fixed, or may be adoptive to background noise as descried above.

Another method of detection and discrimination is as follows: Construct a dictionary of reconstructed signature waveforms, together with time shifts of said waveforms. Using a greedy algorithm, such as a matching pursuit, decompose each new sample signal into a sum of dictionary atoms. Threshold the resulting coefficients in order to determine if a signature is present. One advantage of this method is that multiple signatures may be detected in the same window. Again, the time-shift parameter of the signature provides arrival time that may be utilized for localization. Again, the threshold may be fixed, or may be adoptive to background noise as descried above. The number of time shifts of each signature signal within the dictionary will be determined by the uncertainty principal, with (optional) further refinement in time occurring once a signature is approximately located. This algorithm may also be coded by simply listing each signature once in the dictionary and taking time shifts as needed before each inner product comparison.

In each case, detection may proceed on one or more channels individually, and the results can be pooled to determine statistically the likelihood of positive detection. In certain embodiments, the signals are combined with the following method: The signals from individual channels are cross-correlated to time- and phase-align them, by matching correlation peeks. The time-phase aligned signals are then summed (or averaged) and the resulting signal is compared to the database as in the same manner as any other one-channel signal. This idea may also be extended using the subject GAD engine to analyze multiple signal channels at once.

A method of simultaneous detection and discrimination is as follows: Construct a dictionary of reconstructed signature waveforms, together with time shifts of said waveforms. Using a SSA, decompose the signals simultaneously into matched structure books. By using the GAD SSA, time and phase similarity windows may be defined wide enough to accommodate different arrival time of the signature at different microphone. Threshold the resulting coefficients in order to determine if one or more signatures are present. Again, multiple signatures may be detected in the same window. The extra information available from simultaneously treating multiple transducers will, in certain circumstances, increase the robustness of the detection. Again, the time-shift parameter of the signature provides arrival time that may be utilized for localization. Again, the threshold may be fixed, or may be adoptive to background noise.

Figure 6:
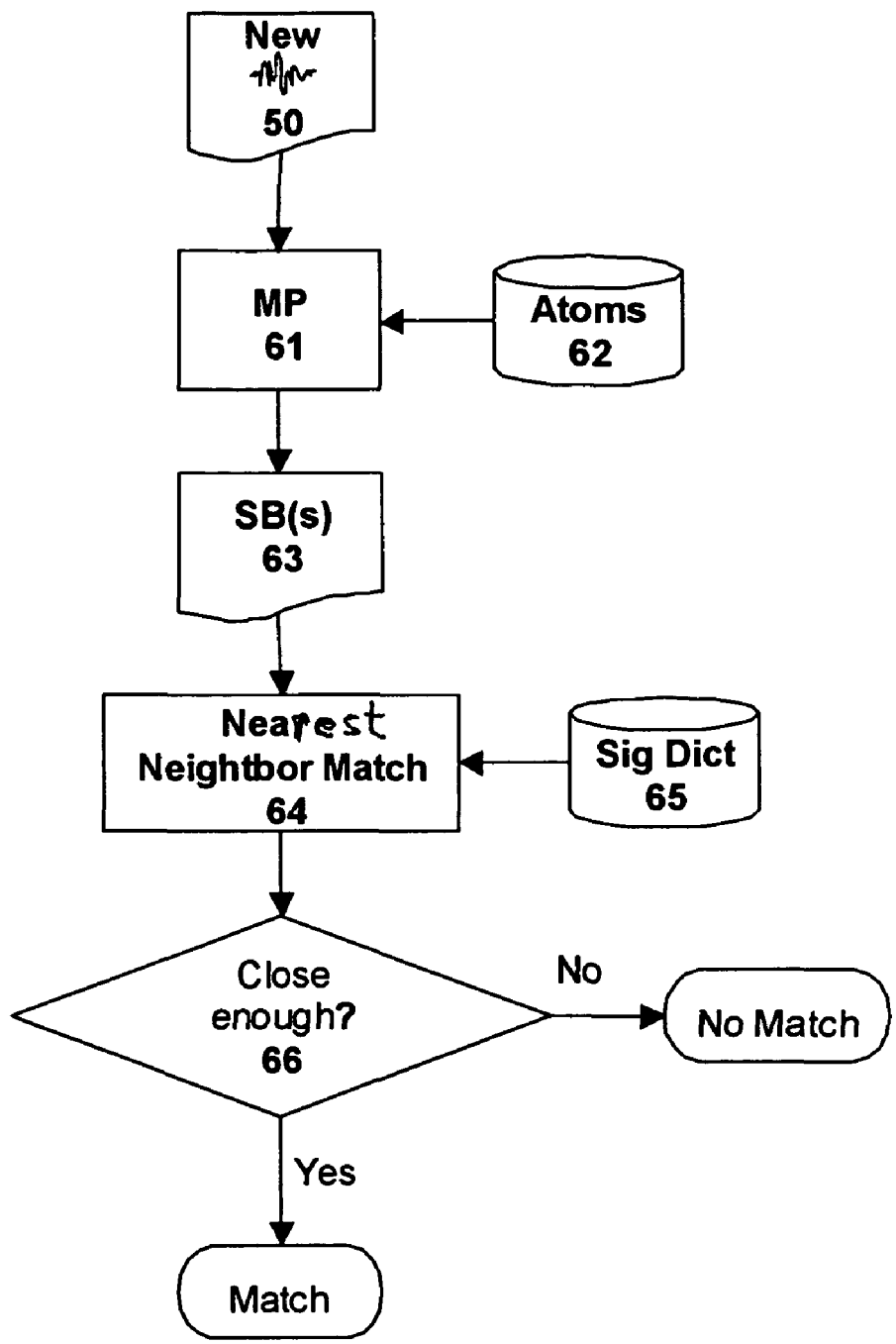
FIG. 6 is a flow diagram of a two stage detector/classifier, utilizing separate processes for discovering signal component atoms and signature combinations.
Figure 7:
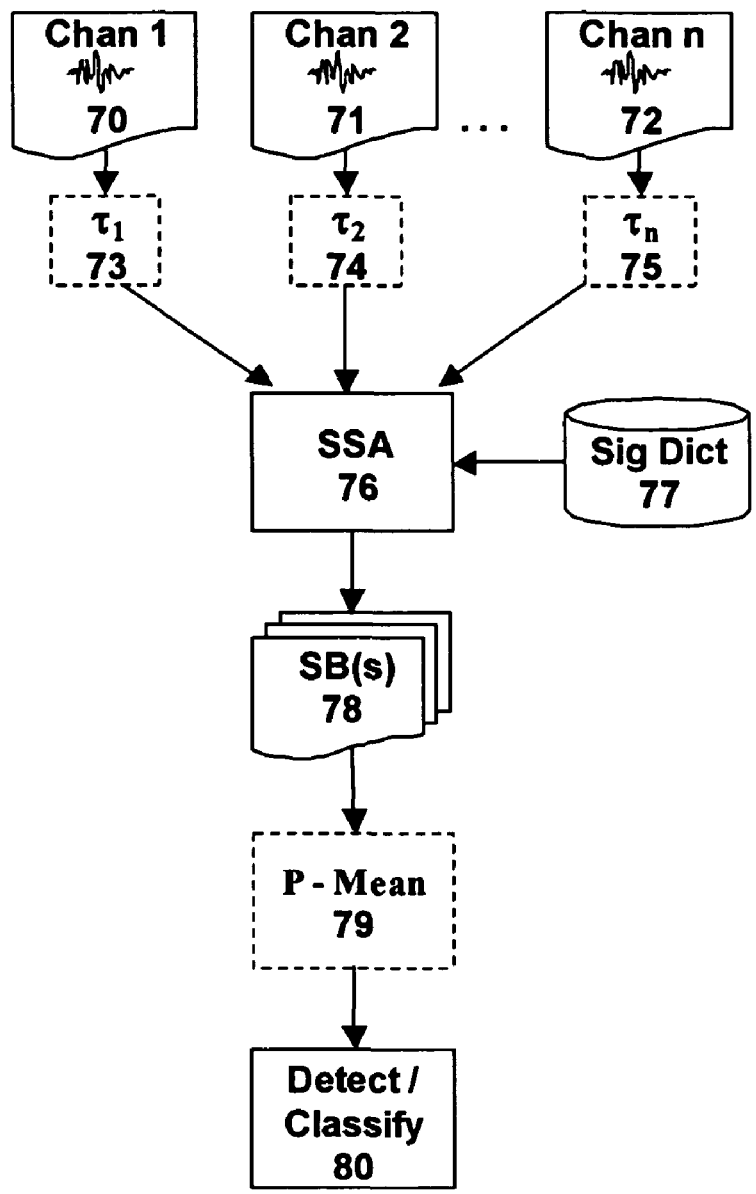
FIG. 7 is a flow diagram of a simultaneous, multi-channel detector/classifier.

One embodiment of the process is illustrated in FIG. 7. A plurality of transducer channels 70, 71, 72 are analyzed simultaneously by an SSA 76, utilizing a signature dictionary 77. The resulting matched structure books 78 are processed by taking a parametric mean 79, and the mean structure book is fed to a detector/classifier as elsewhere described (e.g., FIG. 5 above, or FIG. 6 below.) The dotted boxes 73, 74, 75 indicate optional time delays that may be inserted to compensate for variations in arrival time at transducers so that the time-similarity window may be decreased in the GAD SSA to reduce false associations. Such pre delays may be utilized as well in locating the sound source; this is addressed below. The delays may comprise actual time shifts introduced before the SSA or may be coded as time shifts that occur on the fly during the comparison operations of the SSA.

Each method may be modified to utilize the reduced dimensionality structure books discussed above. Suppose two signatures f1 and f2 have been identified using the parametric mean process. One embodiment utilizes a dictionary that includes f1\f2, f2\f1, and the intersection, f1∩f2. Thus the signatures f1 and f2 are represented in their entirety using separable components. Detection of f1\f2 and f1∩f2 together in correct proportions positively identifies the presence of f1 in the sample. The detection is robust since all components of the signal are factored in, while the discrimination decision between f1 and f2 is simplified since the common components may be ignored without taking additional steps.

Each method may be modified to utilize other groups of atoms rather than the complete reconstruction to represent signatures in the dictionary. One example is to simply include each atom from each extracted signature's structure book in the dictionary. This embodiment will offer advantages in that the dictionary is compromised of standard atoms that, in certain circumstances, will lead to efficiencies of implementation. It may also reduce storage requirements since the dictionary can take advantage of redundancies. However, detected atoms must be mapped to the signatures. If we proceed by decomposing a new signal in the dictionary of signature sub components, we must then determine if the resulting decomposition is sufficiently close to one of the known signatures to qualify as a match.

FIG. 6 illustrates one embodiment of the process. The new signal 50 is fed to a matching engine 61 (in this case a Matching Pursuit operation, but variations may be substituted) that utilizes a dictionary of atoms 62 as just discussed. The resulting structure book 63 is matched with a nearest neighbor metric 64 against a signature dictionary 65. The signature dictionary comprises the combinations of atoms and their relationships (e.g., signature structure books) that are within the comparison set. The nearest neighbor search may be performed by numerous methods, well known in computer science, with the goal of finding a signature structure book in the dictionary 65 that minimizes some metric. Typically this metric quantifies a "distance" between the test structure book 63 and any given signature structure book in the dictionary 65. A vector norm on the difference in coefficients of matched atoms, for example, is one functional embodiment. In certain embodiments, a vector norm will be applied to the atom parameters to quantify how close one atom is to another; thus dissimilar atoms can be grouped approximately for comparison purposes.

The illustrated process next makes a decision as to whether the match was close enough 66 to reliably suggest a good fit. If yes then we report detection along with the matched signature, otherwise we report no match. In various embodiments, this test 66 will be performed by thresholding, by statistical inference, and by other heuristic means.

The atom dictionary in some embodiments will be the entire analysis dictionary; this has the advantage of analyzing each new sample in the same manner as the training corpus, and allowing noise in the signal to be mapped away from the atoms need to detect signatures. In other implementations the reduced dictionary containing only those atoms necessary for signature detection will be include in the dictionary, speeding processing and simplifying the nearest neighbor comparisons. Recall that the GAD SSA is a greedy algorithm, selecting best fits first; a compromise therefore is to include all atoms selected in the process until it was terminated, whether or not those dictionary atoms are associated with a particular signature. This ensures that larger noise components are mapped away from the signature sets. In general, if the atoms are time localized, then sufficient time-shifts of the original should be included to at least satisfy the limits of the classical uncertainty principle.

Using components rather than unified reconstructions in the matching dictionary also opens up the possibility of loose approximation and fuzzy matching. Complex environments as diagramed in FIG. 1B, may delay or attenuate different components of the signal differently. By including sufficient variation in the dictionary, we may allow the atoms matched to independently vary from the "ideal" signature and still discover the correct match using a nearest neighbor operation. The process illustrated in FIG. 6 and already discussed may be utilized in exactly this way by allowing for imperfect matches between atoms. We enable this aspect by either expanding the minimal dictionary of signature atoms 62 to include parameter variants in an appropriate small neighborhood around the primary values; or we include an allowance for variation in the comparison code operations in the matching engine 61.

Yet another novel method of signature detection is afforded by the subject methods. In this case, rather than extracting signatures from known sources in a pre-training process, we simply compare them directly to an existing corpus of signature samples.

Figure 8:
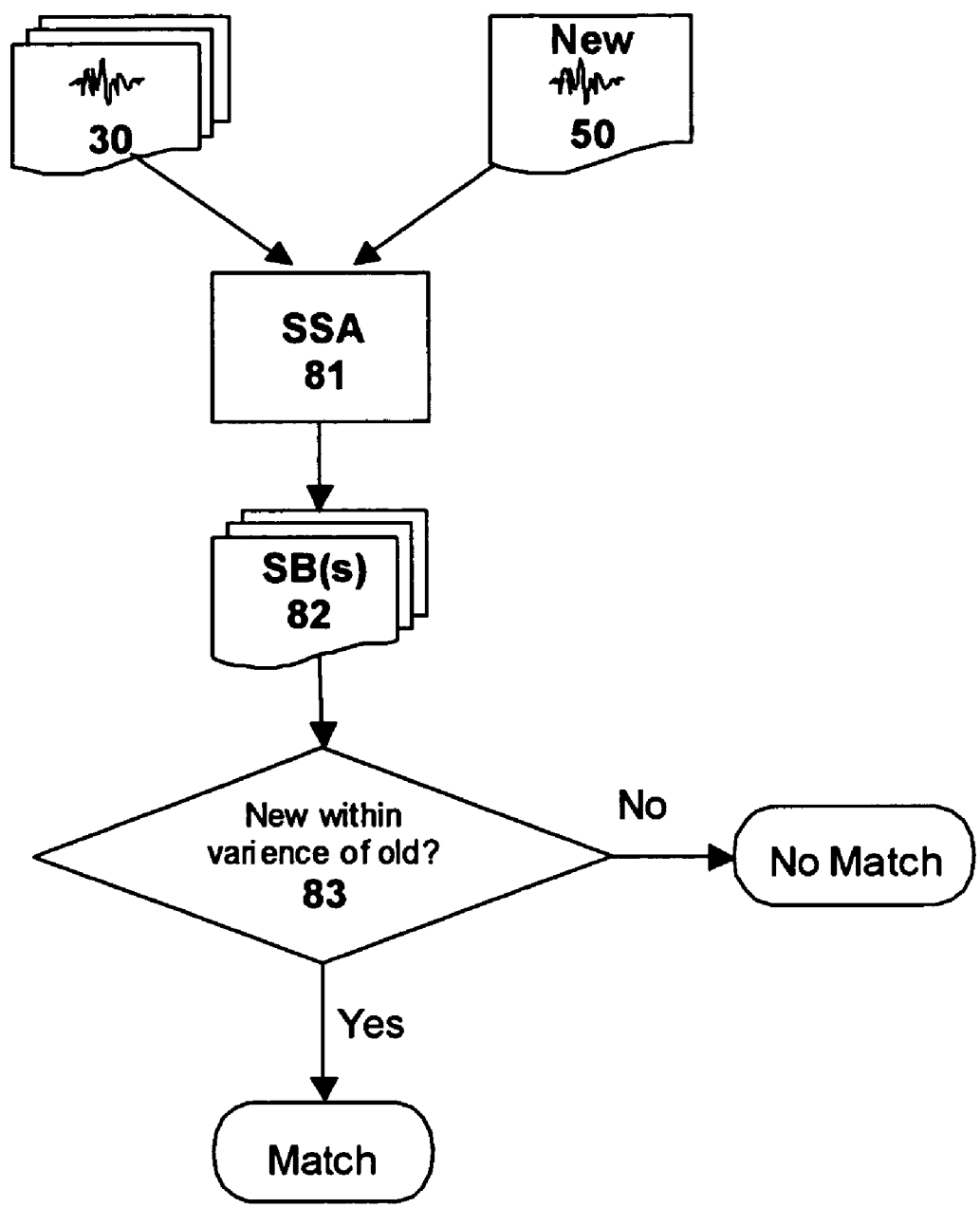
FIG. 8 is a flow diagram for an adaptive detector/classifier that matches signals against prior samples rather than to an extracted signature set.

The method is illustrated in FIG. 8: A collection of signature samples 30 of one or more classes is analyzed together with a novel sample 50. The SSA engine 81 (such as that described in the GAD Application) produces a collection of matched structure books 82. These structure books are then analyzed by means of comparing the values associated with atoms of the novel signal's structure book to those of the remaining structure books. If they are within a limit defined by the variance range of the known matches, we declare a match, otherwise no match. The variance analysis may be a standard statistical test (e.g. a Z-score) or any of a variety of measures that compare one value to a group of others. It may be as simple as a threshold to test if it is within the spanned range of variance. The method may include only a single class of signatures in 30, in which case the test 83 is binary. It may also include a plurality of signature classes, in which case the test 83 is modified to perform a nearest neighbor on the segregated structure books in the manner described for FIG. 6.

This novel method has certain advantages over the other systems. In particular, no training is required and no dictionary of abstracted signatures is required. Among other benefits, this also allows a deployed system the ability to learn by exposure and accommodate the environment by example. In this mode, as each new signal is classified a match, it may be added to the corpus. The method also allows us to create a new "classification" engine building block that can be used without pre-training in larger processing systems. Note, however, that the storage requirements for the method may be substantial since the full signals are retained without a reduction of dimensionality. Furthermore, the process will often be slower than that of signature based matching systems when large signal sets are involved. This may be addressed partially by implementing the method in dedicated hardware.

Other detection systems may be utilized. It will be clear to those skilled in the art that the signature discovery and extraction processes detailed in the GAD Application and above generate a set of features of interest. Using the general system of FIG. 5A, these features may be analyzed by a host of other means. These include neural networks, Bayesian decision networks, logical and fuzzy logical operations, statistical analyses, and so on.

Signal Localization

There are two primary means of determining the location of an acoustic energy source from the sound-pressure on one or more transducers: amplitude and phase. Using a directional microphone, for example, one may scan an acoustic field to find a peak in amplitude response. Using two or more microphones, one can compare volumes to predict direction; the prediction may give a sufficient result, or may guide a scan that better localizes the source. Because sound travels at a finite velocity, the difference in phase (or more generally, relative time delay) of signal arrival between two or more microphones also predicts direction. Again, the microphones may be steered to localize the sound, or a best estimate may simply be extracted from the time arrival times without moving the microphones. Clearly the ideas can be combined.

These examples are basic, and those skilled in the art will immediately recognize that far more sophisticated techniques for extracting direction from time, phase and amplitude information are well known. The invention utilizes novel SSA methods to extract this information from noisy signals, thus enabling localization. Some example processes follow.

The directional sensitivity of an array of transducers may be electronically steered by adjusting relative time delays before combining their signals. This well-known technique is termed beam forming. It may be used to steer and/or focus transmitting or receiving sensor elements. In order to localize sound using an array of transducers, many devices of prior art perform a virtual scan of the space of interest. In effect, they adjust relative time-delays in a controlled fashion to study local portions of the sound field, while searching for a peak in the signal of interest. The systems and methods disclosed in the GAD Application and in the present document, afford unique benefits in aiding this sort of search.

On basic combination of techniques is as follows: A scanned beam-forming array is fed into a signature detector, as described in previous sections. Positive detection then identifies not only the signature of interest, but also its relative location (or direction.)

A second combination of techniques is as follows: One or more individual transducers of the array are analyzed for signatures. On positive detection, the recognizable components of the signature are extracted. The beam-forming array is then scanned across the sound field looking for the source of the extracted components. Embodiments of this technique often have faster update cycles than those of the preceding technique, because the scanning process is not initiated until a signature is identified in the first place. One advantage of the subject invention and the detector designs described is that they can extract a precise model of the signature as it actually appears in the environment, and even be utilized to reconstruct the waveform of interest exactly. Note that the "scanning" process may be real in certain embodiments, or may comprise a virtual scan of the multi-channel data recorded form the transducer arrays. The virtual scan of stored data has two advantages: (1) The target signature is known precisely since it was extracted from the same data, and (2) if the target signature is a transient or non-stationary signal it can still be recovered from the saved data.

Source localization procedures are not limited to pre-constructed phased arrays of transducers. Any set of transducers with known relative locations can be utilized to discover location information. The relative delay methods may be applied if the spacing exceeds the wavelengths of interest, however and the general term "time" rather "phase" delay applies. Arrays of sensors need not be fixed. Ad hoc arrays may be constructed from available data sources; transducers may be placed as needed or scattered by some means. If the transducers are not at fixed locations, one mechanism for aligning the signals temporally and calibrating the system is to transmit localizing information (such as differential GPS, or inter-sensor acoustic pulses). Another method is to utilize a known source of acoustic emissions and extract phase and time differences from the signal arrival times at each transducer. Amplitude information may likewise be extracted, and the arrays may be calibrated (or cross checked) by applying R-squared dispersion models.

A further method of discovering transducer locations enabled by the methods of the GAD Application is to utilize GAD to analyze an unknown source at a known location. Once a signature is extracted by processes discussed above, one can then look for the same signature across channels an extract time/phase information (and/or amplitude) to calculate position information for the sensors.

Returning to the source localization problem, a third combination of techniques afforded by the invention is as follow:

One or more individual transducers of the array are analyzed for signatures. On positive detection, the recognizable components of the incoming signature are extracted to a structure book. An approximation of the detected signature is reconstructed. Each channel is then examined to extract time of arrival of the signature elements. If the signature cannot be reliably identified in a given channel then that channel is dropped from consideration. Relative arrivals times (and/or amplitudes) are then compared among successful channel(s) in order to insure consistency; again, problem channels may be dropped from the pool. Finally, timing information from remaining channels is combined to extract an estimation of source location.

Note that only two transducers are typically necessary to locate the approximate direction of a sound source in two dimensions. The combined arrival time information will place the source on a curve. Half of this curve will be on either side of the line that connects the two transducers; however, the hemisphere in which the source is usually known by other means. A third sensor generally adds enough information to estimate range as well as direction. Localization in three dimensions requires an additional sensor. More sensors add redundancy and robustness to the localization, especially in complex, inhomogeneous environments. Of course, more channels increase the processing load on the system. These statements are intended as broad guidelines, and not as specific requirements of the subject invention.

Extracting relative arrival times is straightforward when the signal of interest is loud in comparison to the background. In this case, the reconstructed signature can be compared to each channel by cross-correlation, and the resulting peaks will occur in each channel at the relative time delays.

The invention affords another novel variation of this idea: rather than reconstructing the signature in its entirety, one or more component elements of the signature structure book may be analyzed separately. This process improves over the prior art, in that it automatically compensates for possible frequency dependant time or phase delays introduced by the environment. By allowing the components of the signal to vary in time relative to one another, and then averaging the resultant estimates of arrival time, it is possible to achieve lower channel rejection rates while minimizing overall error.

Rather than using cross-correlation, it also possible to use an inner product comparison method as described in the GAD Application to extract time information. By applying a Gabor dictionary (or similarly time parameterized set of atoms), the best-fit match can be directly translated to a time parameter. Furthermore, a sub-dictionary search may be utilized to speed the search time, as disclosed in the GAD Application.

In the presence of a noisy environment, there is no guarantee that best-fit (by GAD or cross-correlation) will independently result in the correct arrival time estimate for each channel. False peaks may result from channel specific noise that is similar to the signature (or its components.) Therefore, consistency filter should be applied to improve localization.

A greedy algorithm for combining channel information proceeds as follows: Select the channel with the best signature candidate in the data and extract an arrival time estimate, select the next best channel and extract an arrival time estimate, etc. As the number of channels exceeds the required number for localization, compare for consistency, dropping channels that are inconsistent with the majority of the data points.

The process is complicated further if searching for signature sub-components, rather than the entire signature. In this case, the atoms must properly correlate with each other not only across channels, but also within a channel. The solution is similar to the lose association signature detection method addressed above, and in the FIG. 6.

Figure 9:
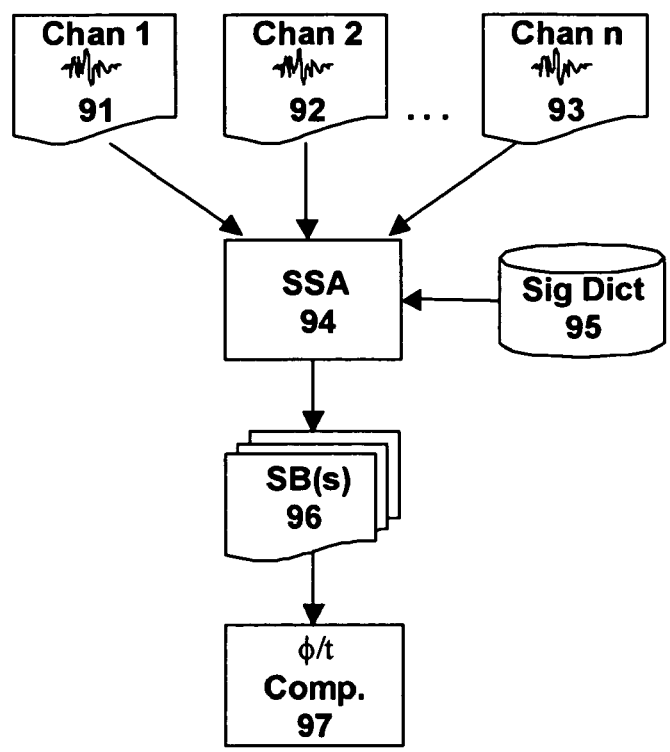
FIG. 9 is a flow diagram for recovering time localization information from a multi-channel SSA analysis.
Figure 9:
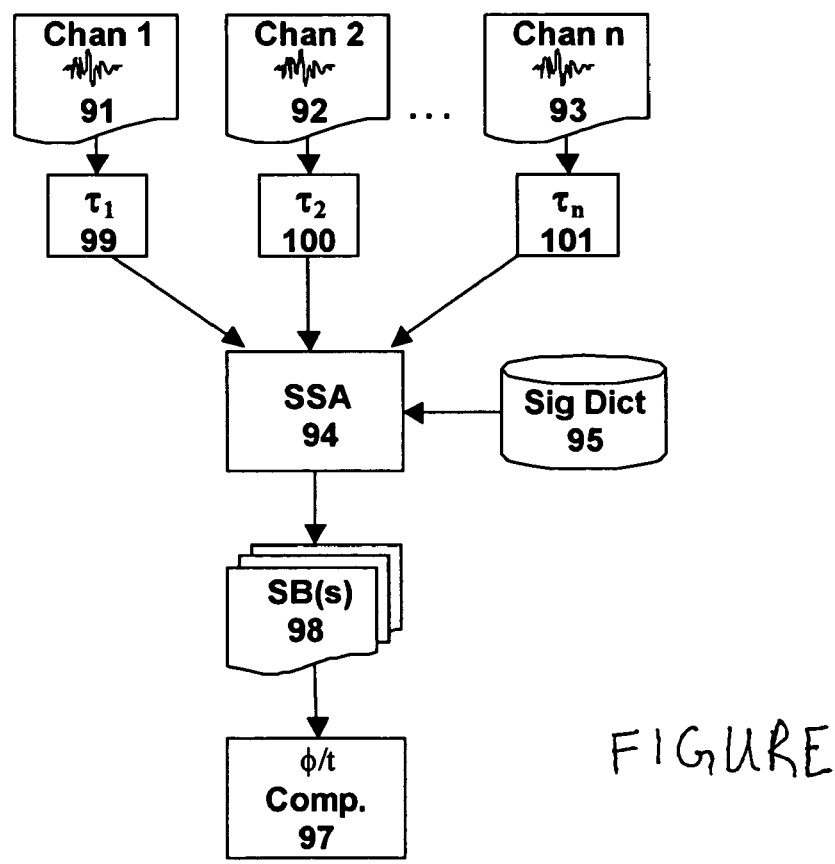

An additional method of directly extracting time information is also afforded by the methods of the GAD Application in the presence of multi-channel data. Signature detection and discrimination may proceed using a simultaneous GAD process on all (or a subset) of the transducer signal segments at once. This procedure is illustrated in FIGS. 9A and 9B. FIG. 9A illustrates the basic idea: Signals from a plurality of transducer channels 91, 92, 93 are analyzed simultaneously by and SSA 94, utilizing a signature dictionary 95. The resulting matched structure books 96 are processed by comparing phase and time information between matched components in 97. The differences across channels can be averaged, thus extracting an estimate of the relative delay between each channel. From the time delays, source position information can be calculated in a well-understood manner.

If the transducers are located in a closely spaced array, then the time-similarity range of the GAD SSA may be set to accommodate the worst reasonable delay. However, with widely spaced sensors, this is problematic since it will increase the chance or erroneous association between atoms. In this case a time delay may be introduced in each channel, in order to allow the system to be "scanned" in the manner of a phased array: that is, sensible time delays $\tau_i$ are introduced and systematically modified until the signature is discovered with reasonable magnitude in all (or a majority) of the channels. The magnitude is measured by a mean (or RMS) across the atom coefficients in the collection of structure books. Timing information is then extracted from the structure books for each atom and summed with the respective pre-delay value $\tau_i$ before being averaged to a final estimate of the arrival time in each channel. Location information is then estimated from the relative arrival times.

FIG. 9B introduces pre-delays 99, 100, 101 before the SSA operation; the diagram is otherwise similar. The matched structure books 98 will, however, differ since they interact with the pre delay times $\tau_i$. These independently variable time delays may be inserted to compensate for variations in arrival time at transducers so that the time-similarity window may be decreased in the GAD SSA to reduce false associations. The delays may comprise actual time shifts introduced before the SSA or may be coded as time shifts that occur on the fly during the comparison operations of the SSA. Furthermore, the time phase information 97 extracted from the structure books 96, may be used to guide the time delays $\tau_i$ (99, 100, 101) in order to "zero-in" on a proper window for each channel. (This idea is not illustrated in the figure.)

In addition to time and phase information, amplitude information may be extracted. This is not shown on the figure. Amplitude may be used to help model the source location and increase-performance of the system through well-known methods. In addition, other parameters such as frequency and scale variations may inform the system about the environment. For example, different delays at different frequency ranges might indicate properties of materials through which the signal is traveling.

An additional novel method of extracting position information is available within the GAD framework. Rather than mathematically deducing location from time, amplitude, and other parameters, in certain embodiments, the system may be trained. By exposing signature extraction mechanisms (see FIG. 3 or FIG. 4, for example) to multiple presentations of a sound source in multiple locations, one may extract parametric mean representations of signature-location combinations. One may likewise present multiple signatures first at one location, than another, do utilize the system to discover automatically how sound characteristics change with the location of the source.

In the first case embodiment, signature-location combinations are encoded just like signatures, hence the detectors/classifiers already described will return a map to both the signature and its location. In the second case embodiment, location is encoded separately, hence detection of signatures and localization will proceed independently (either sequentially or in parallel) using multiple detectors as described above.

Figure 10:
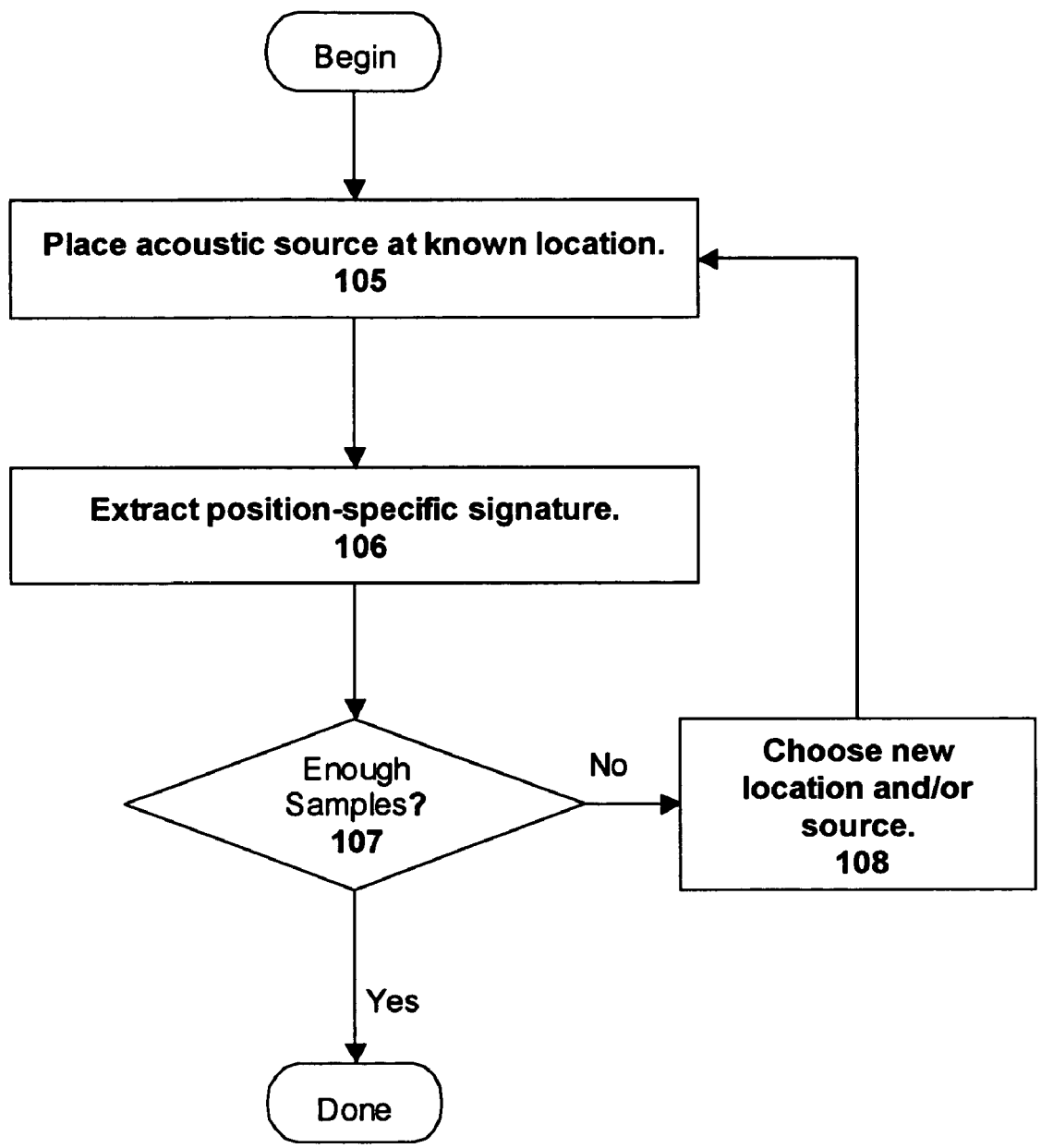
FIG. 10 is a flow chart showing a process for training a subject system to localize signal sources by example.

FIG. 10 illustrates the training process for the two embodiments. We begin in step 105 by placing an acoustic source at a known location. We then in step 106 record an appropriate collection of sample signals and extract a position-specific signature as detailed herein and in the GAD Application. We test for sufficient samples in 107. If we have sufficient samples, we stop the process. Otherwise, we choose a new location (or new acoustic source) in step 108 and repeat from 105. The process generalizes the basic training idea of sampling multiple sources to build a dictionary of signatures.

This novel idea also affords a deployed system the ability to learn its environment. That is, sensors may be positioned and exposed to sounds at known locations to calibrate the system and automatically compensate for environmental inhomogeneity.

The GAD engine makes available phase, time, and amplitude information for detected signatures. With proper dictionary choices, it also extracts frequency, phase, and other parameters. It will be clear to those skilled in the art that additional direction finding technique not enumerated here utilize such information, and thus may be facilitated by adapting methods similar to those disclosed.

The systems, processes, and methods disclosed and discussed herein are presented in the context of a specific application, namely acoustic signature processing. Upon examining and understanding the disclosure herein and within the GAD Application, it will be clear to those skilled in the art that similar methods may be applied to other energy mediums and to other applications. Examples include RF and optical signature processing, pattern recognition in data and graphical images, electrical recordings from human and animal subject, and so on.

The acoustic systems and methods may specifically be applied to a host of applications. Some contemplated applications include: mineral discovery by monitoring acoustic returns from ground penetrating energy; detection and classification of personnel, vehicles, or other targets of strategic military or intelligence interest; detection and classification of personnel or equipment within buildings and structures; detection and classification of navel vessel, swimmers, divers, or marine animals in an underwater environment; detection and classification of human, animal, or mechanical sounds in remote wilderness; detection and classification of acoustic sounds in urban and other human occupied environments; detection and classification of aircraft and birds; detection and classification of weather phenomena; detection and classification of machine malfunction or impending malfunction; detection and classification of ultrasound returns in inspection of organisms or materials; detection and classification (diagnoses) of human health status and disease states; acoustic biometric; voice and/or speaker recognition. This list is intended to be merely exemplary and should not in anyway be construed as exhaustive.

The above description relates to certain preferred modes and example embodiments of the invention. The inventor contemplates variations and additional features and functions within the skill of the art, including advances in operational technology. Various modifications other those discussed above may be resorted to without departing from the sprit of scope of the invention. For example, equivalent elements may be substituted for those specifically shown and described. Certain features may be used independently of other features, various methods in dependently described may be combined and in certain cases, particular locations of elements may be reversed or interposed, all without departing from the sprit or scope of the invention.

I claim:

1. An apparatus for extracting, detecting, classifying, discriminating, localizing, and processing acoustic signals comprising:
   a) at least one transducer device operable to collect a plurality of signals;
   b) instructions for decomposing the signals into matched structure books wherein decomposing comprises performing simultaneous sparse approximations of the signals; each said structure book representation defining a multi-dimensional combination of coefficients and atoms; and
   c) a computer memory for storing said structure-book.

2. The apparatus of claim 1 wherein the at least one transducer device capable of collecting a plurality of signals includes one or more acoustic sensors.

3. The apparatus of claim 1 wherein the processing device executes a Greedy Adaptive Discrimination (GAD) decomposition algorithm operating with a dictionary of prototype atoms.

4. The apparatus of claim 3 wherein the dictionary comprises a set of Gabor atoms together with the Fourier and delta function bases.

5. The apparatus of claim 3 wherein the dictionary includes a random set of atoms.

6. The apparatus of claim 3 wherein each atom selected for the structure book representations by the GAD decomposition is caused to be orthogonal from all previously chosen atoms.

7. A method of signature extraction comprising the steps of:
   a. establishing two or more analysis sets, each set comprising at least one signal;
   b. decomposing the sets of signals into matched structure books wherein decomposing comprises performing simultaneous sparse approximations of the signals; each said structure book representation defining a multi-dimensional combination of coefficients and atoms; and
   c. actuating the processing device to produce a parametric mean structure book representative of a signature for each group of signals.

8. The method of claim 7 wherein a separate simultaneous sparse approximation is formed for each analysis set.

9. The method of claim 7 wherein a single simultaneous sparse approximation is formed for the aggregate collection of signals from all analysis sets.

10. A method of signal detection and classification comprising the steps of:
    a. collecting a set of signals;
    b. decomposing the sets of signals into matched structure books wherein decomposing comprises performing simultaneous sparse approximations of the signals; each said structure book defining a multi-dimensional combination of coefficients and atoms; and
    c. comparing the resulting structure books to structure books of known signatures.

11. The method of claim 10 wherein a single simultaneous sparse approximation is formed for the aggregate collection of signals from all analysis sets.

12. The method of claim 10 wherein step c is accomplished by examining the values of the coefficients of the atoms in the resulting structure books to typical values for similar atoms of one or more known signatures.

13. The method of claim 10 wherein the simultaneous sparse approximation is accomplished with respect to a dictionary comprising one or more known signature waveforms.

14. The method of claim 10 wherein the simultaneous sparse approximation is accomplished with respect to a dictionary comprising the aggregate collection of atoms present in previously extracted structure books of known signatures of interest.

15. The method of claim 14 wherein the dictionary additionally includes the aggregate collection of all atoms selected during the sparse approximation that produced the previously extracted structure books of known signatures of interest, whether or not said atoms are present in said structure books of signatures of interest.

16. The method of claim 10 wherein a plurality of signals are collected and at least one of the signals is time-shifted relative to at least one other signal before the simultaneous sparse approximation operation.

17. The method of claim 10 wherein:
   a. the collected signal or signals are sparsely approximated in aggregate with at least one previously established signal; and
   b. the structure books of the previously established signal or signals are compared to those of the newly collected signal or signals in order to classify the new signal or signals as either similar or different from the previous group.

18. The method of claim 10 wherein a plurality of signals are collected at different locations and, subsequent to detection, time and phase information from the resulting structure books at different locations are used to extract directional information about the signals.

19. The method of claim 10 wherein:
   a. a plurality of signals are collected at different locations;
   b. each signal is analyzed independently to detect signatures;
   c. detected signatures are reconstructed; and
   d. each channel is searched for the reconstructed signature to determine time of arrival information.

* * * * *